US012662407B2

(12) United States Patent
Snow et al.

(10) Patent No.: US 12,662,407 B2
(45) Date of Patent: Jun. 23, 2026

(54) INTERLOCKING REFRACTORY BRICKS AND REFRACTORY LAYER STRUCTURES FORMED THEREWITH

(71) Applicant: HarbisonWalker International Holdings, Inc., Moon Township, PA (US)

(72) Inventors: Bryn Christine Snow, Bridgeville, PA (US); Tomas Richter, Wexford, PA (US); Thomas S. Williams, Gibsonia, PA (US)

(73) Assignee: HarbisonWalker International Holdings, Inc., Moon Township, PA (US)

( * ) Notice: Subject to any disclaimer, the term of this patent is extended or adjusted under 35 U.S.C. 154(b) by 211 days.

(21) Appl. No.: 18/423,420

(22) Filed: Jan. 26, 2024

(65) Prior Publication Data

US 2025/0243101 A1     Jul. 31, 2025

(51) Int. Cl.
*C03B 5/237*          (2006.01)
*F27D 1/00*          (2006.01)

(52) U.S. Cl.
CPC ............ *C03B 5/2375* (2013.01); *F27D 1/004* (2013.01)

(58) Field of Classification Search
CPC .... B32B 3/02; B32B 3/06; B32B 3/10; B32B 3/12; B32B 18/00; B32B 2315/02;
(Continued)

(56) References Cited

U.S. PATENT DOCUMENTS 1,492,685 A      5/1924  Hale
2,107,675 A  *   2/1938  Mckelvy ................ F28D 17/02
                                                    165/DIG. 21
(Continued)

FOREIGN PATENT DOCUMENTS

CN        203695940 U     7/2014
CN        204268893 U     4/2015
(Continued)

OTHER PUBLICATIONS

Machine translation (Espacenet) of DE 3802501 A1. Translated Oct. 18, 2025 (Year: 2025).*

(Continued)

*Primary Examiner* — Maria V Ewald
*Assistant Examiner* — Ethan A. Utt
(74) *Attorney, Agent, or Firm* — RENNER, OTTO, BOISSELLE & SKLAR, LLP

(57)          ABSTRACT
A refractory layer structure includes a plurality of refractory layers stacked on each other. Each of the refractory layers includes refractory bricks. Each of the refractory bricks is formed as a cuboid having a pair of oppositely positioned first diverging sides and a pair of oppositely positioned second diverging sides. The first diverging sides diverge away from each other from a top to a bottom of the refractory bricks. The second diverging sides diverge away from each other from the bottom to the top of the refractory bricks. The first diverging sides and the second diverging sides are connected to each other. Each of the first diverging sides have a first diverging side protrusion projecting from a top surface thereof. Each of the second diverging sides have a second diverging side protrusion projecting from a top surface thereof.

11 Claims, 16 Drawing Sheets

(58) Field of Classification Search
CPC ...... Y10S 165/03; Y10S 165/035; F27D 1/04;
F27D 1/042; F28D 17/00; F28D 17/02;
C03B 5/237; C03B 5/2375
USPC .................. 428/33; 165/4, 9.1, 9.2, 9.3, 9.4,
165/DIG. 30, DIG. 35
See application file for complete search history.

(56) References Cited

U.S. PATENT DOCUMENTS

| | | | | | |
|---|---|---|---|---|---|
| 2,651,515 | A | * | 9/1953 | Agnew | C21B 9/06 |
| | | | | | 165/9.3 |
| 2,844,452 | A | * | 7/1958 | Hasche | F28D 17/04 |
| | | | | | 48/212 |
| 3,220,367 | A | | 11/1965 | Stein | |
| 3,269,070 | A | | 8/1966 | Stoy | |
| 3,394,521 | A | | 7/1968 | Coleman | |
| 3,953,009 | A | | 4/1976 | Kan | |
| 4,527,617 | A | | 7/1985 | Gagne et al. | |
| 4,651,810 | A | | 3/1987 | Triessnig | |
| 4,768,578 | A | | 9/1988 | Sulit | |
| 5,069,015 | A | | 12/1991 | Steinwender | |
| 5,361,557 | A | | 11/1994 | Snyder et al. | |
| 2004/0244944 | A1 | | 12/2004 | Bald | |

FOREIGN PATENT DOCUMENTS

| | | | | |
|---|---|---|---|---|
| CN | 105386558 | A | 3/2016 | |
| CN | 205897854 | U | 1/2017 | |
| CN | 112611225 | A | 4/2021 | |
| CN | 215879860 | U | 2/2022 | |
| DE | 3436041 | A1 | 5/1985 | |
| DE | 3802501 | A1 * | 9/1988 | .......... F27D 17/302 |
| GB | 564086 | | 9/1944 | |
| GB | 874391 | | 8/1961 | |

OTHER PUBLICATIONS

International Search Report and Written Opinion issued in related International Application No. PCT/US2024/057398 dated Mar. 11, 2025.

* cited by examiner

26

INTERLOCKING REFRACTORY BRICKS AND REFRACTORY LAYER STRUCTURES FORMED THEREWITH

FIELD OF THE INVENTION

The present invention relates generally to furnaces, and, more specifically, to the assembly and installation of interlocking shapes in preheating chambers of furnaces.

BACKGROUND OF THE INVENTION

A conventional regenerative glass melting furnace 2 is illustrated in FIG. 1. The assembly and installation of checker bricks 6 in a preheating regenerator chamber 4 of the glass melting furnace 2, or any other furnaces, such as hot blast stoves, is currently done in a conventional way with the individual layers of the checker bricks 6 being assembled from within the regenerator chamber 4.

More particularly illustrated in FIG. 2, the regenerator chamber 4 is large and contains multiple layers of checker bricks 6 as typically constructed. It is common for such units to have 30 or more layers of the checker bricks 6. The assembly and installation of the layers of the checker bricks 6 requires careful and detailed preparation and highly skilled personnel. The installation personnel is working within the regenerator chamber 4, typically without scaffolding at a sizeable safety risk. As designs of the refractory lining change from standard series brick sizes to large assemblies or large format shapes, the construction requires many crane movements to supply the installation site. This significantly slows down the installation process and increases the costs for labor and equipment use.

The layers of the checker bricks 6 illustrated in FIGS. 1 and 2 are only one example of checker brick patterns that are conventionally utilized. A chimney-type modular design checker setting 16, illustrated in FIG. 3, is a common and modern pattern that provides for good thermal efficiency and stability. Some checker brick patterns, such as checker setting 26 illustrated in FIG. 4, offer interlocking and horizontal contact area to provide greater system stability. A conventional straight-brick checker setting 36 is illustrated in FIG. 5. Checker setting 36 can be designed with interlocks between the individual layers, which increase stability of the construction and inhibit slippage or spinning between the individual layers.

However, installation of any of the checker bricks 6 and checker settings 16, 26, and 36 is labor intensive and requires attention to installation details, emphasizing proper bonding and mating of the individual checker bricks 6 into the setting. In addition, all of the checker bricks 6 have simple perpendicular geometry that is subject to easy displacement and shifting within individual layers of the checker settings 16, 26, and 36.

For example, even if the checker settings 16, 26, and 36 have interlocks between individual layers, vertical movement and slippage can occur independently within the individual layers themselves. These occurrences complicate stability of the checker settings 16, 26, and 36 within the regenerator chamber 4 and substantially inhibit any attempt to construct individual layers of the checker settings 16, 26, and 36 outside of regenerator chamber 4 for stacking via crane in the regenerator chamber 4.

This type of geometry also unidirectionally projects a heavy construction load from the top to the bottom of the construction. A flaw in the assembly cannot be properly absorbed, thereby generating local stress in the construction.

This stressed construction, under the heavy load of the multiple layers of the checker bricks 6, may lead to a shift of individual checker bricks 6 and, thus, the entire checker settings 16, 26, and 36. As a consequence, after prolonged service and sustained exposure to elevated temperatures, current constructions could deform in the stressed portions of the construction, leading to a partial collapse of the construction. The resultant efficiency of the regenerator chambers 4 is significantly diminished or can even lead to a complete failure and closure of the glass melting furnace 2.

The invention is designed to address these conventional drawbacks.

SUMMARY OF THE INVENTION

In an example embodiment of the invention, a refractory layer structure includes a plurality of refractory layers stacked on each other. Each of the refractory layers includes refractory bricks. Each of the refractory bricks is formed as a cuboid having a pair of oppositely positioned first diverging sides and a pair of oppositely positioned second diverging sides. The first diverging sides diverge away from each other from a top to a bottom of the refractory bricks. The second diverging sides diverge away from each other from the bottom to the top of the refractory bricks. The first diverging sides and the second diverging sides are connected to each other. Each of the first diverging sides have a first diverging side protrusion projecting from a top surface thereof. Each of the second diverging sides have a second diverging side protrusion projecting from a top surface thereof. Each of the first diverging sides and the second diverging sides have a notch formed in a bottom surface thereof. The first diverging sides and the second diverging sides together define a vertically oriented passageway extending through the refractory bricks of each of the stacked refractory layers. Any contact made between the refractory bricks within one of the refractory layers is made between one of the first diverging sides of one of the refractory bricks and one of the second diverging sides of another one of the refractory bricks. The first side protrusions and the second side protrusions of the refractory bricks of the one of the refractory layers are respectively fitted into the side notches of the refractory bricks of another one of the refractory layers stacked on the one of the refractory layers.

In another example embodiment of the invention, a refractory layer structure includes a plurality of refractory layers stacked on each other. Each of the refractory layers includes refractory bricks locked by each other in a tessellated pattern. Each of the refractory bricks has sides. Each of the sides has a protrusion projecting from a top surface thereof and a notch formed in a bottom surface thereof. The sides define a vertically orienting passageway extending through the refractory bricks of each of the stacked refractory layers. Any contact made between the sides of the refractory bricks within one of the refractory layers is made between one of the sides of one of the refractory bricks that is parallel with one of the sides of another one of the refractory bricks. The side protrusions of the refractory bricks of the one of the refractory layers are respectively fitted into the side notches of the refractory bricks of another one of the refractory layers stacked on the one of the refractory layers The present invention provides a refractory layer structure in which interlocking shapes of the refractory brick serve to secure stability of a multi-layered structure in horizontal and vertical directions.

The present invention further provides a refractory layer structure in which the sides of each refractory brick have angled or curved geometry, thereby inhibiting vertical movement within a refractory layer.

The present invention further provides a refractory layer structure in which the mating of protrusions formed on the upper surface of the bricks and notches formed on the lower surface of the bricks server to lock the structure horizontally.

The present invention further provides a refractory layer structure in which an individual layer can be secured outside of an operating unit with a securing band, enabling the secured layer to be lifted with one crane movement and placed in the operating unit, thereby making installation of the refractory layer structure safer, faster, and less costly.

The present invention further provides and a refractory layer structure in which the interlocking, angled, and curved geometry of the brick redirects, reorients, and diminishes localized stresses in the construction of the refractory layer structure, resulting in more uniform vertical load and longer service life with inhibition of hot temperature deformations or structural failures.

These and other advantages will become apparent from the following description of a preferred embodiment taken together with the accompanying drawings and claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

Figure 1:
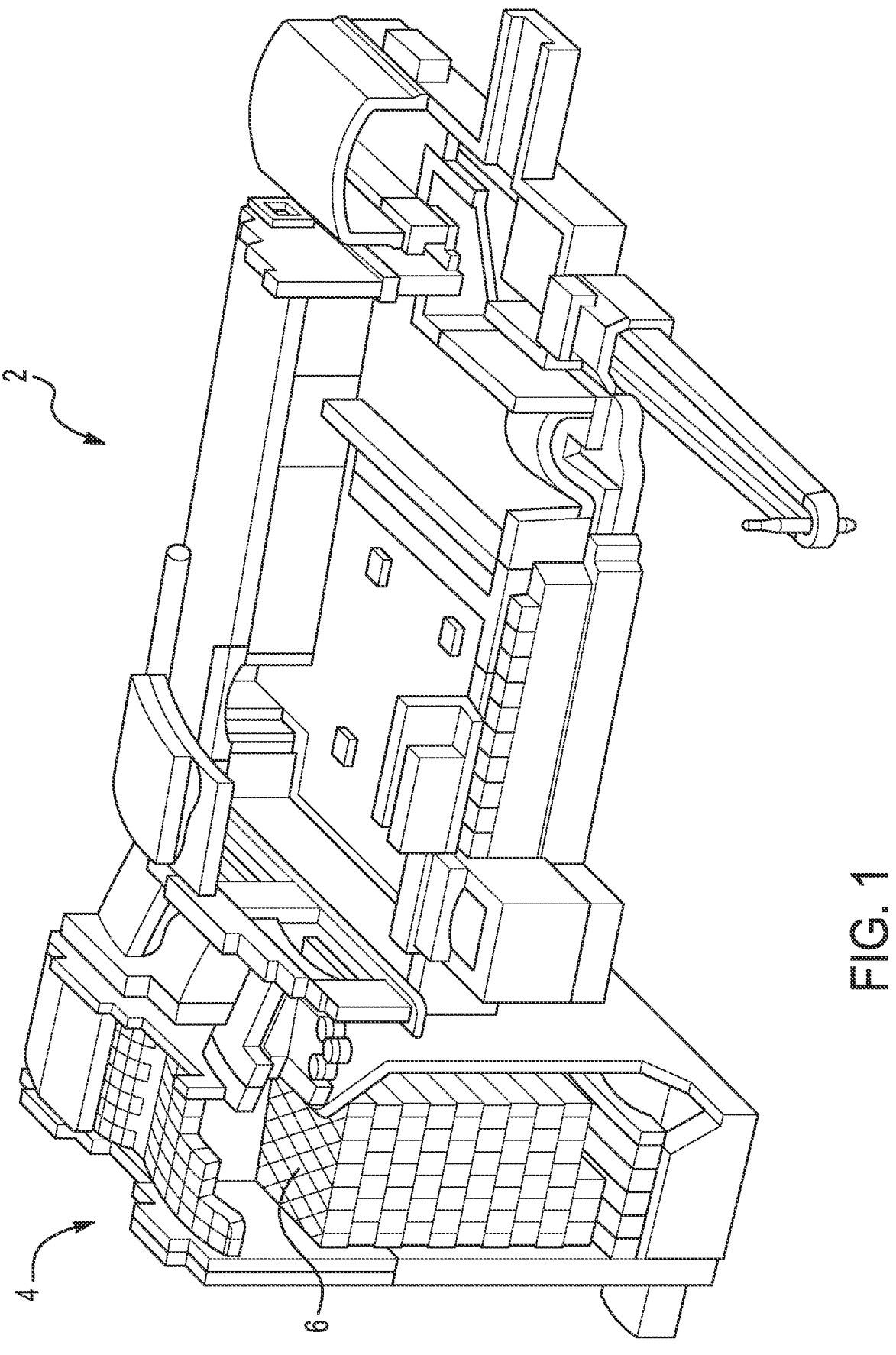
FIG. 1 is a perspective view illustrating an example of a conventional regenerative glass melting furnace.
Figure 2:
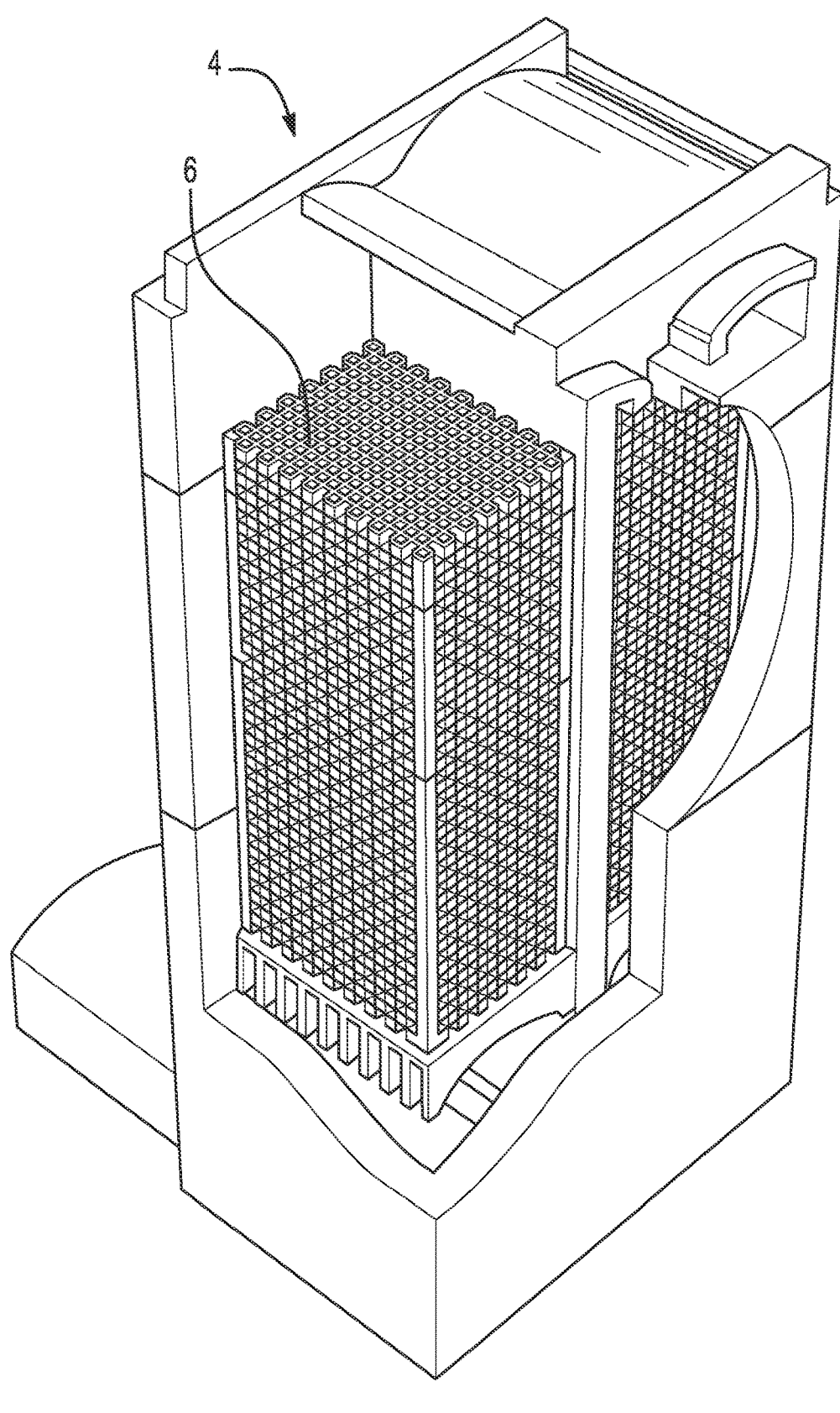
FIG. 2 is a perspective view illustrating an example of regenerator chamber of a conventional regenerative glass melting furnace.
Figure 3:
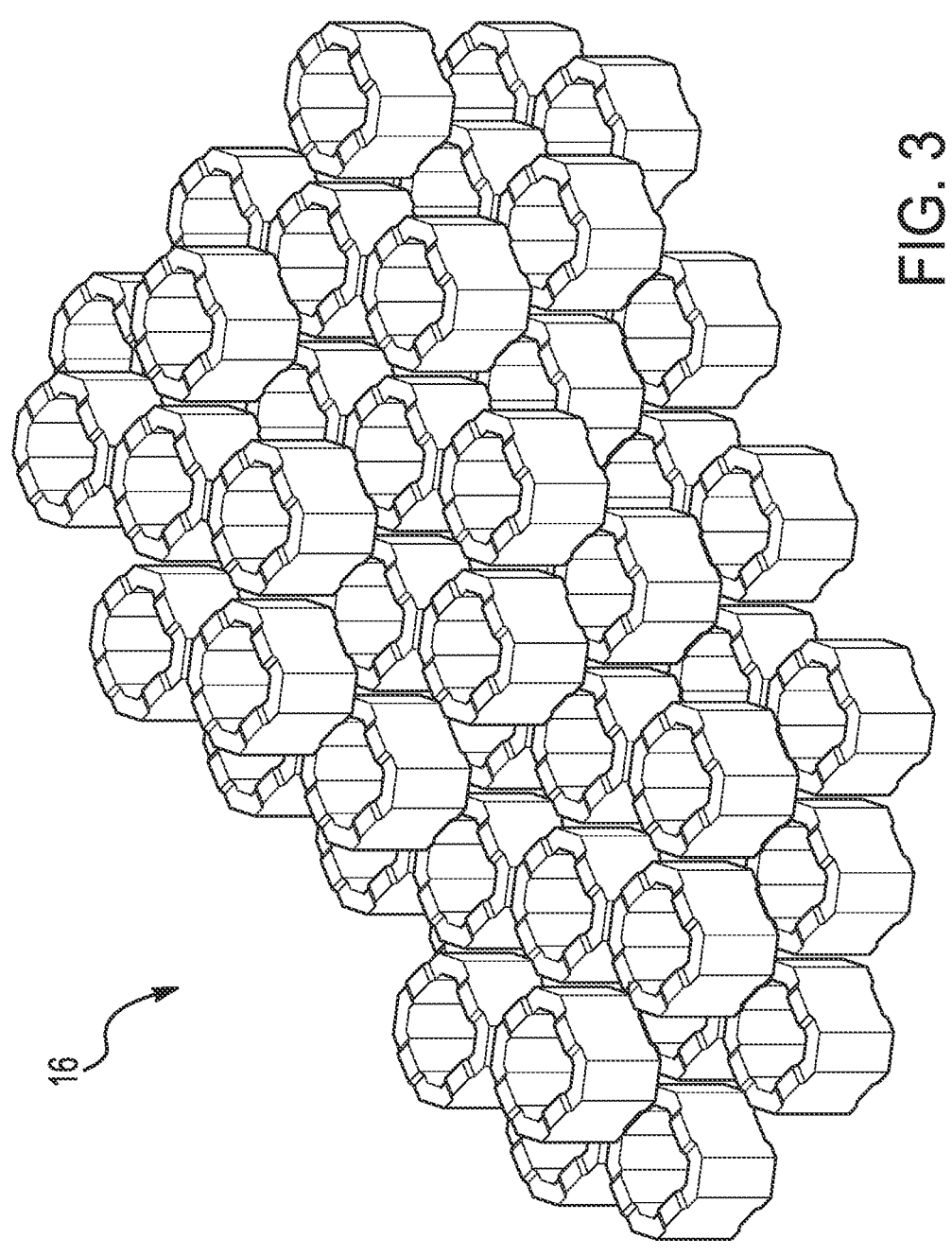
FIG. 3 is a perspective view illustrating an example of a HPC checker setting.
Figure 4:
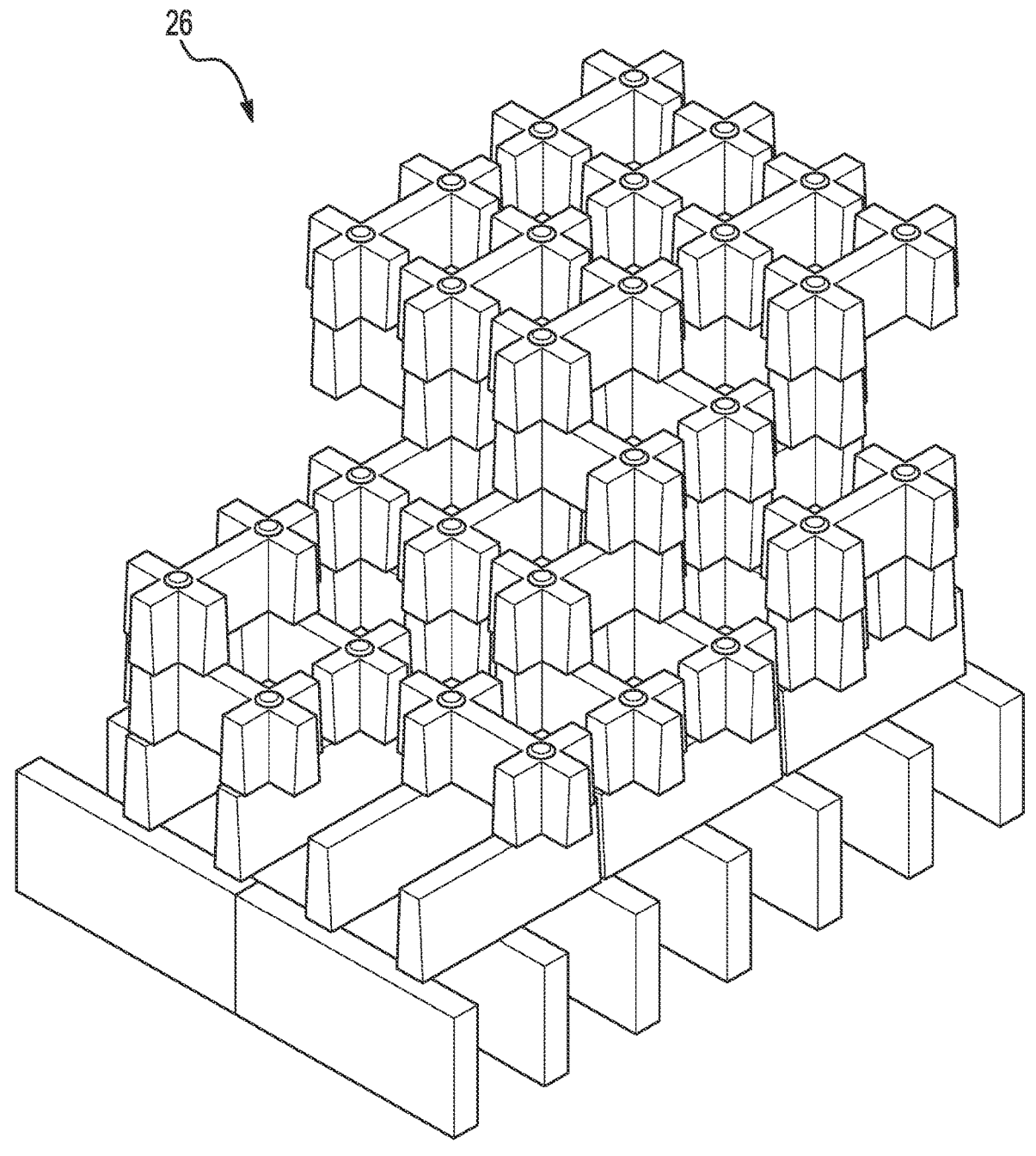
FIG. 4 is a perspective view illustrating an example of a HYDE checker setting.
Figure 5:
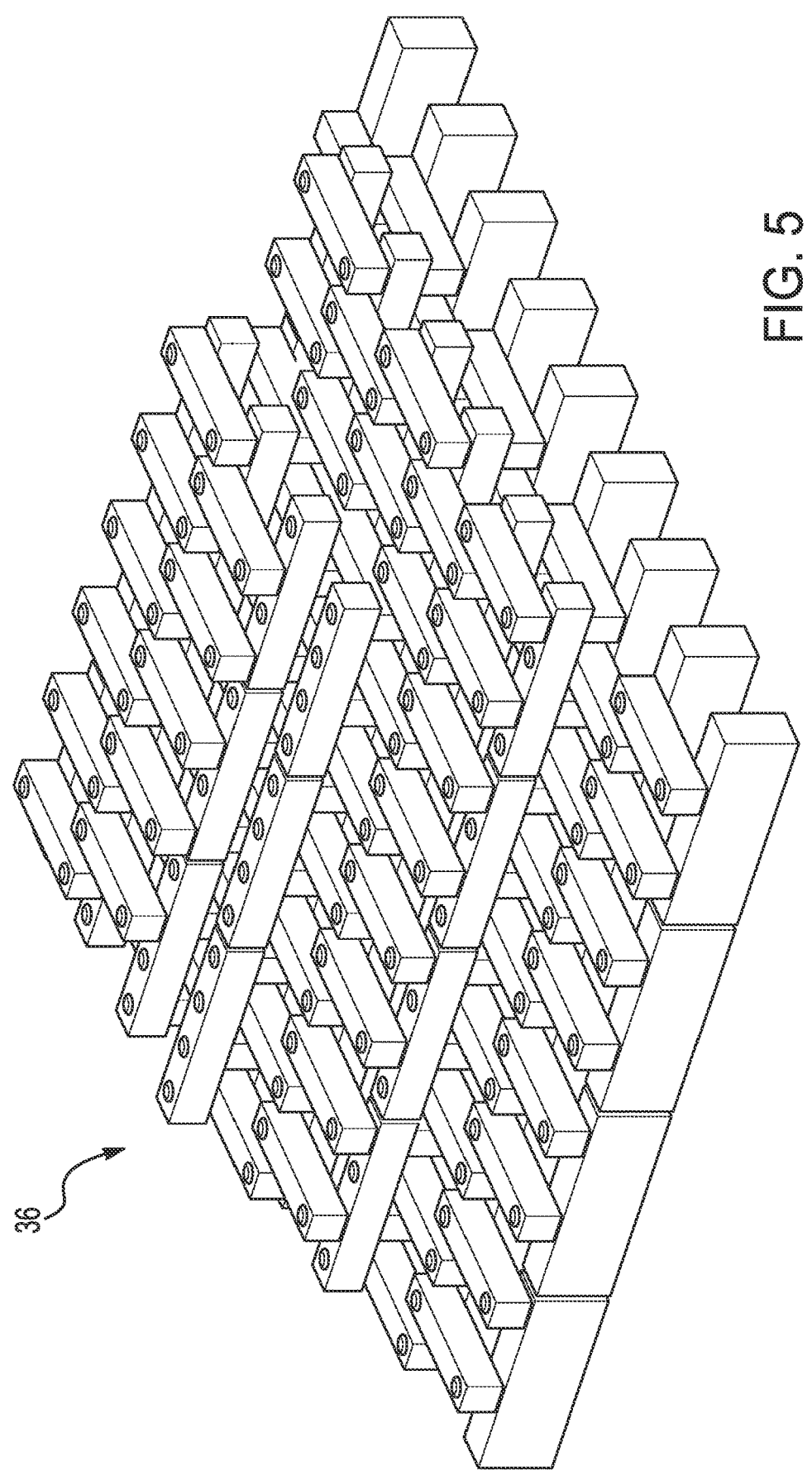
FIG. 5 is a perspective view illustrating an example of another conventional checker setting.

Referring now to the drawings, wherein the showing is for illustrating a preferred embodiment of the invention only and not for limiting same, various embodiments of the invention will be described.

For purposes of this description, a tessellated pattern is defined as an occurrence when geometric shapes having angles or curvatures in contact with each other repeat themselves to fully cover a three-dimensional layer structure without any gaps or overlaps. In the case of the tessellated patterns described herein, each of the geometric shapes contributing to the tessellated patterns is the same shape. However, embodiments described herein are not limited thereto. Further, embodiments described herein do not solely describe geometric shapes contributing to a tessellated pattern. Moreover, geometric shapes described herein do not solely contribute to tessellated patterns.

Figures 6, 7, 8:
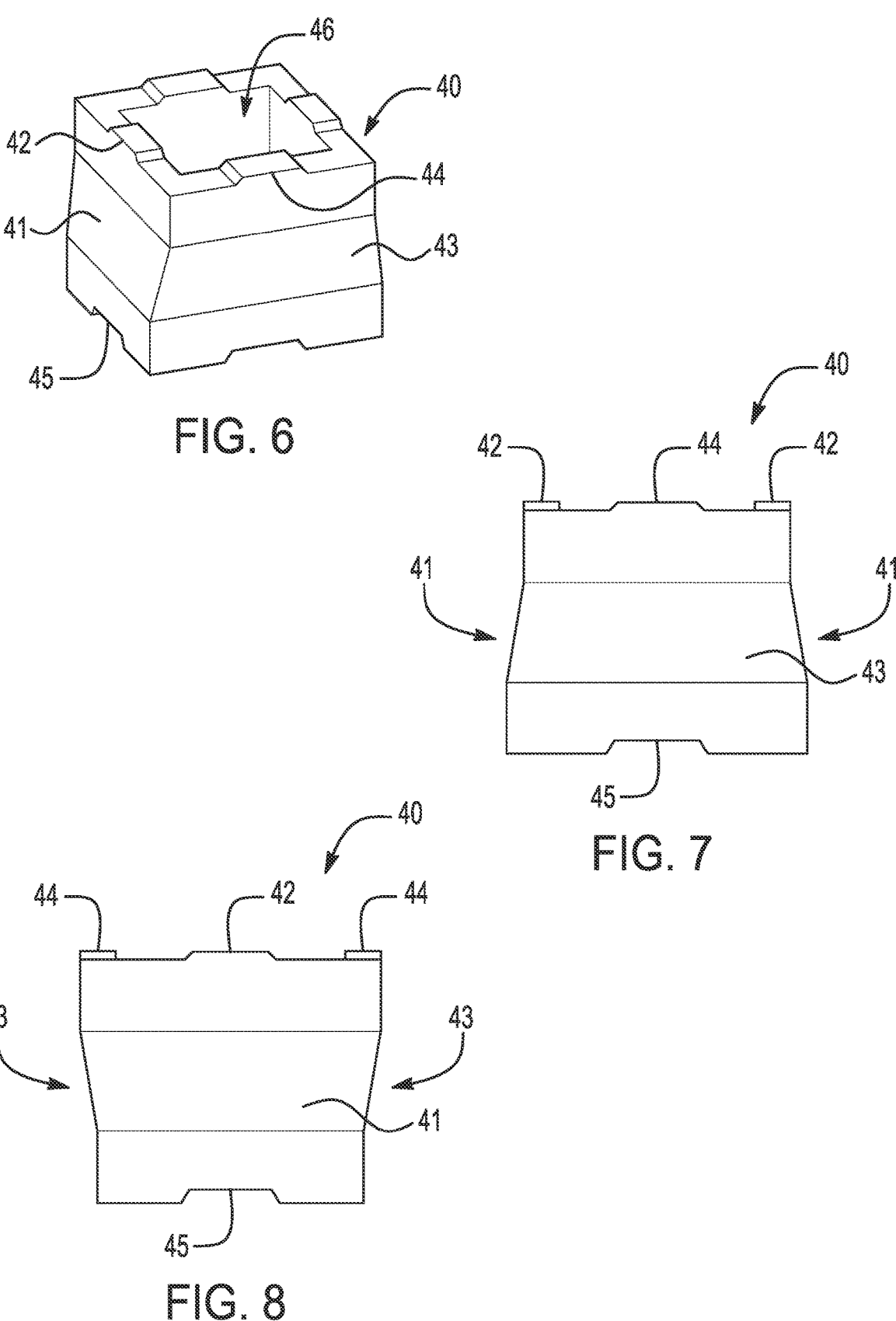
FIG. 6 is a perspective view illustrating an example of a refractory brick according to a first embodiment of the invention.
FIG. 7 is a side view illustrating an example of the refractory brick according to the first embodiment of the invention.
FIG. 8 is another side view illustrating an example of the refractory brick according to the first embodiment of the invention.
Figure 9:
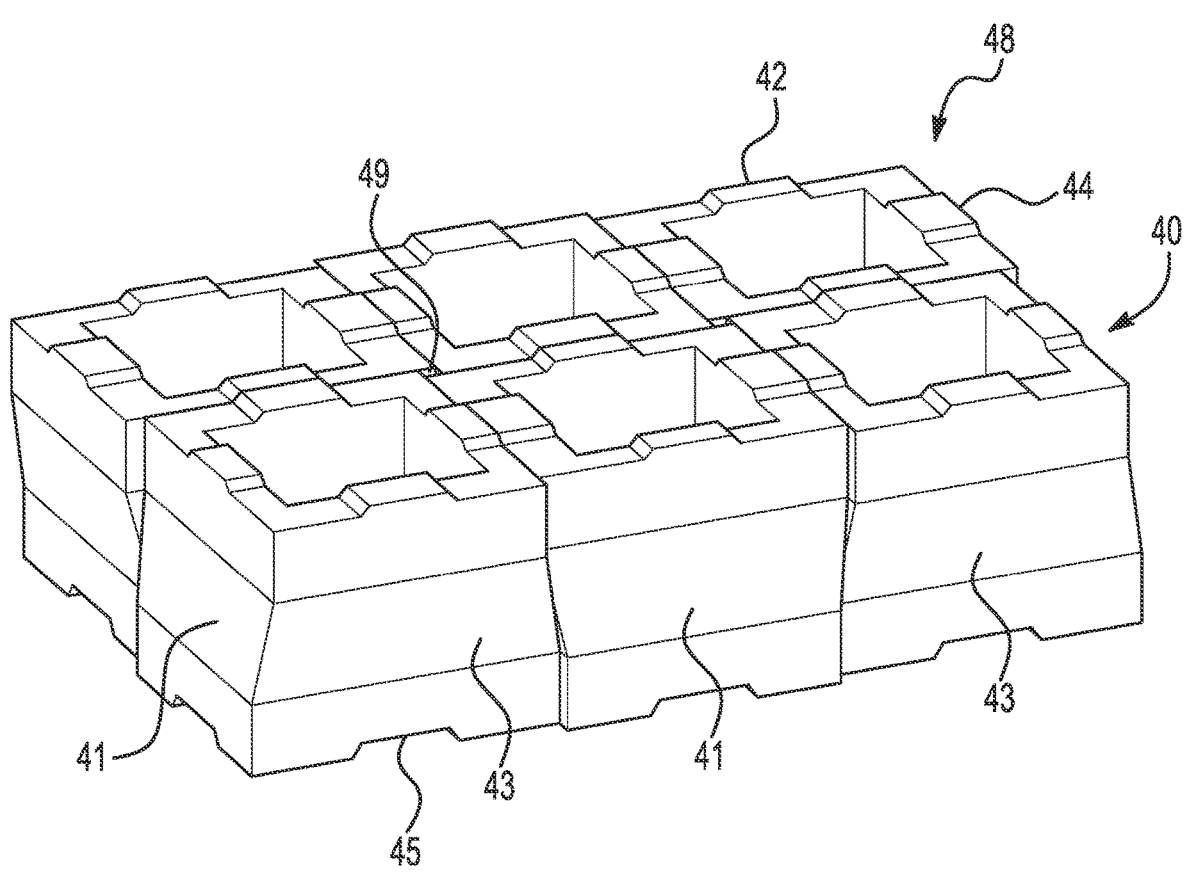
FIG. 9 is a perspective view illustrating an example of a layer of the refractory bricks according to the first embodiment of the invention.
Figure 10:
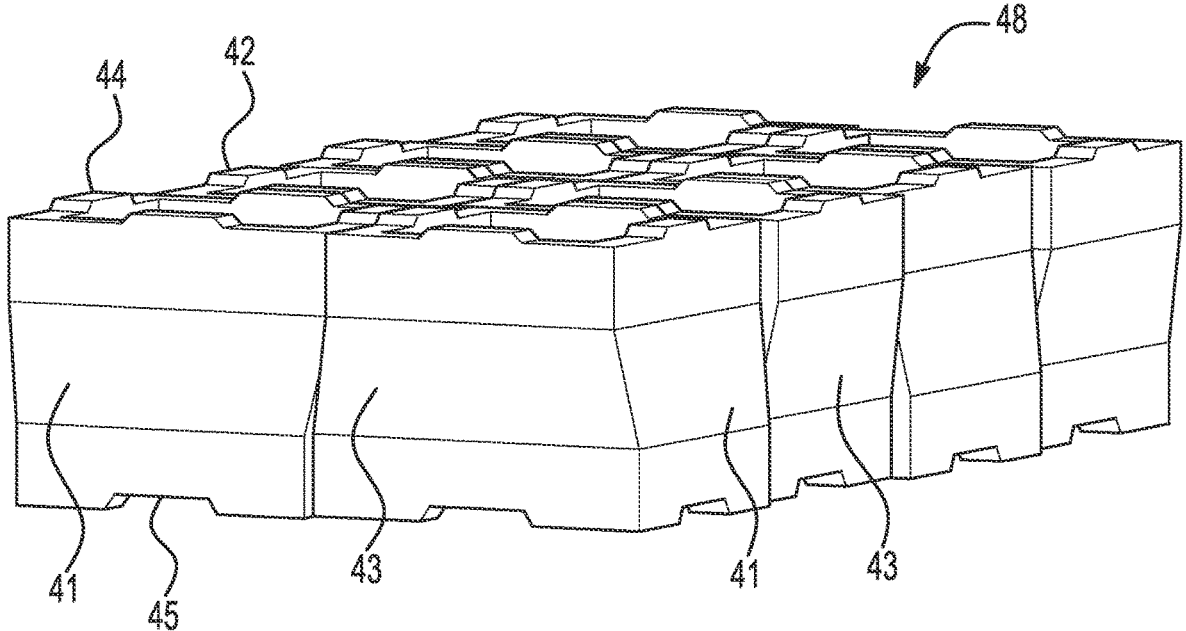
FIG. 10 is another perspective view illustrating an example of the layer of the refractory bricks according to the first embodiment of the invention.
Figure 11:
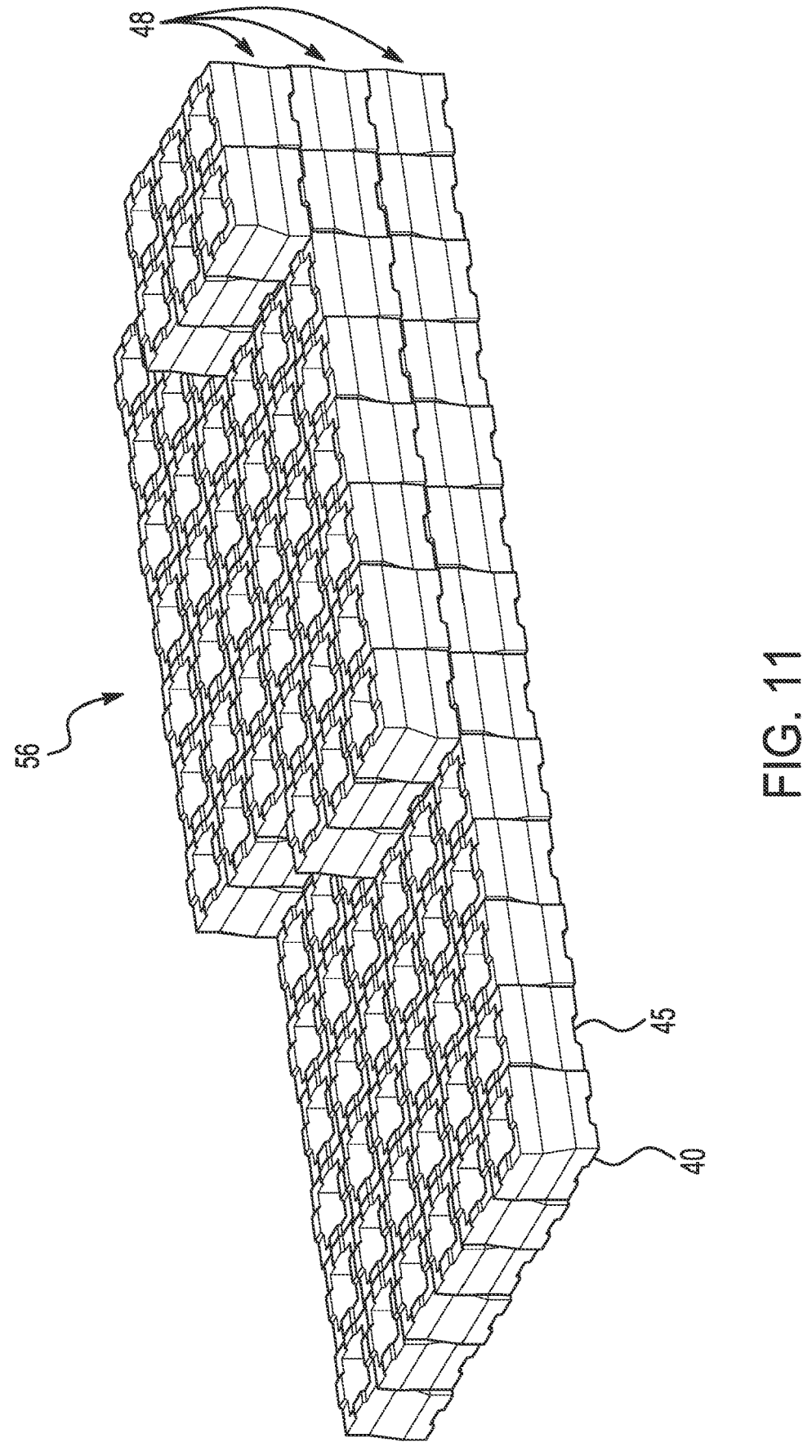
FIG. 11 is a perspective view illustrating an example of a refractory layer structure according to the first embodiment of the invention.

For example, FIG. 6 is a perspective view illustrating an example of a refractory brick 40 according to a non-tessellated embodiment of the invention. FIGS. 7 and 8 are side views illustrating examples of the refractory brick 40. FIGS. 9 and 10 are perspective views illustrating examples of a refractory layer 48 according to a non-tessellated embodiment of the invention. FIG. 11 is a perspective view illustrating an example of a refractory layer structure 56 according to a non-tessellated embodiment of the invention.

The refractory brick 40 may be composed of various combinations of alumina, silica, alumina-silica, magnesia, magnesia-alumina, or combinations of such. The refractory brick 40 may be formed by hydraulic or isostatic pressing. The corresponding refractories are also known to be categorized as High Purity Alumina, High Alumina, Alumino-Silicate, Magnesia, Magnesia-Alumina, or Alumina-Magnesia products.

The refractory brick 40 is realized in the form of a cuboid. The cuboid is defined by a pair of oppositely positioned first diverging sides 41 that are angled in such a way as to diverge away from each other from a top of the refractory brick 40 to a bottom of the refractory brick 40 and a pair of oppositely positioned second diverging sides 43 that are angled in such a way as to diverge away from each other from a bottom of the refractory brick 40 to a top of the refractory brick 40. The second diverging sides 43 and the first diverging sides 41 are connected to each other and together define a vertically oriented passageway 46 extending through the refractory brick 40.

Each of the first diverging sides 41 has a first diverging side protrusion 42 projecting from a top surface thereof. Each of the second diverging sides 43 has a second diverging side protrusion 44 projecting from a top surface thereof. Each of the first diverging sides 41 and the second diverging sides 43 has a notch 45 formed in a bottom surface thereof.

The refractory layer 48 is comprised of a number of the refractory bricks 40. The refractory bricks 40 are placed in the refractory layer 48 such that any contact between the refractory bricks 40 is made between a first diverging side 41 of one of the refractory bricks 40 and a second diverging side 43 of another one of the refractory bricks 40. In other words, each of the refractory bricks 40 in the refractory layer 48 is rotated 90 degrees from the adjacent refractory brick 40. This pattern is repeated throughout the refractory layer 48, along with voids 49 that are formed in an area between groups of four refractory bricks 40 in which surfaces of the first diverging sides 41 and the second diverging sides 43 are not in contact with each other. The placement pattern of the refractory bricks 40 inhibits any vertical movement of the refractory bricks 40 within the refractory layer 48.

The refractory layer structure 56 is comprised of at least one of the refractory layers 48. When more than one of the refractory layers 48 define the refractory layer structure 56, the refractory layers 48 are stacked on each other. Each of the first diverging side protrusions 42 and second diverging side protrusions 44 of the refractory bricks 40 is dimensioned to fit into one of the notches 45 of the refractory bricks 40 to enable mating of vertically stacked refractory bricks 40. As such, the stacking of one refractory layer 48 on top of another refractory layer 48 results in the horizontal locking of the stacked refractory layers 48 due to the mating of the first diverging side protrusions 42 and the second diverging side protrusions 44 of the refractory bricks 40 of the bottom refractory layer 48 with the notches 45 of the refractory bricks 40 of the refractory layer 48 stacked on top thereof. The stacking of the refractory layers 48 in this fashion also maintains the vertically oriented passageways 46 of the refractory bricks 40 throughout the stacked refractory layers 48 for heat exchange purposes. As a result of the geometry of the refractory bricks 40 and the placement of the refractory bricks 40 within the refractory layers 48, localized stresses within the refractory layer structure 56 are redirected, reoriented, and diminished, resulting in a more uniform vertical load and a longer service life.

Figures 12, 13, 14:
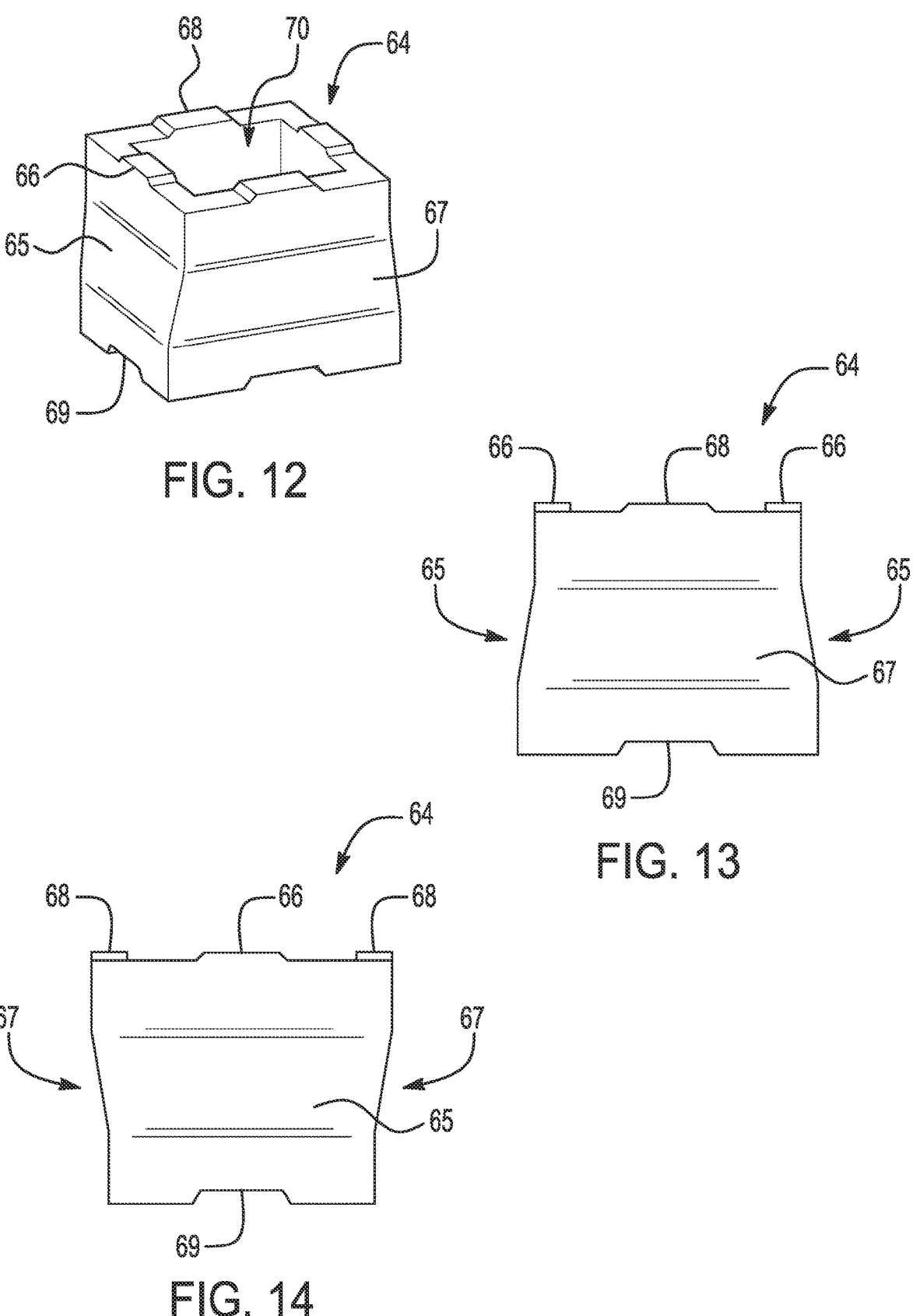
FIG. 12 is a perspective view illustrating an example of a refractory brick according to a second embodiment of the invention.
FIG. 13 is a side view illustrating an example of the refractory brick according to the second embodiment of the invention.
FIG. 14 is another side view illustrating an example of the refractory brick according to the second embodiment of the invention.
Figure 15:
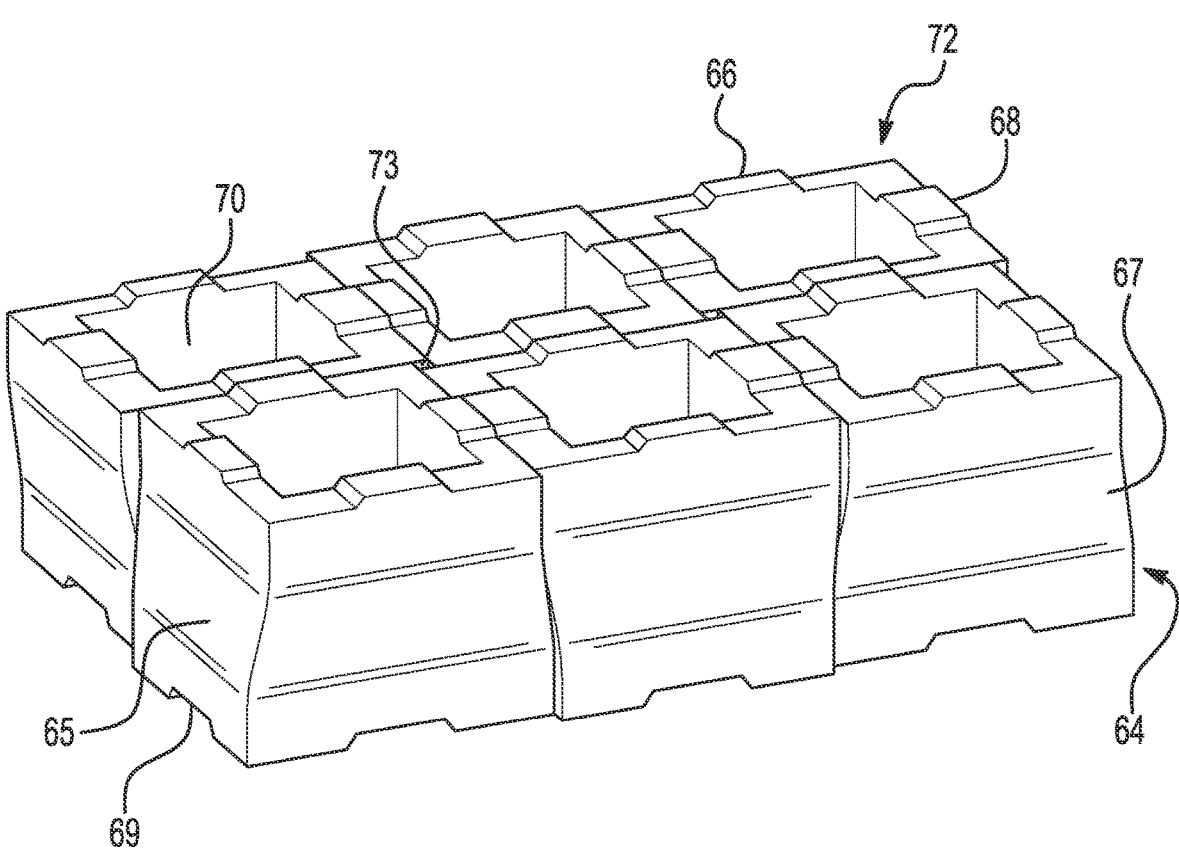
FIG. 15 is a perspective view illustrating an example of a layer of the refractory bricks according to the second embodiment of the invention.
Figure 16:
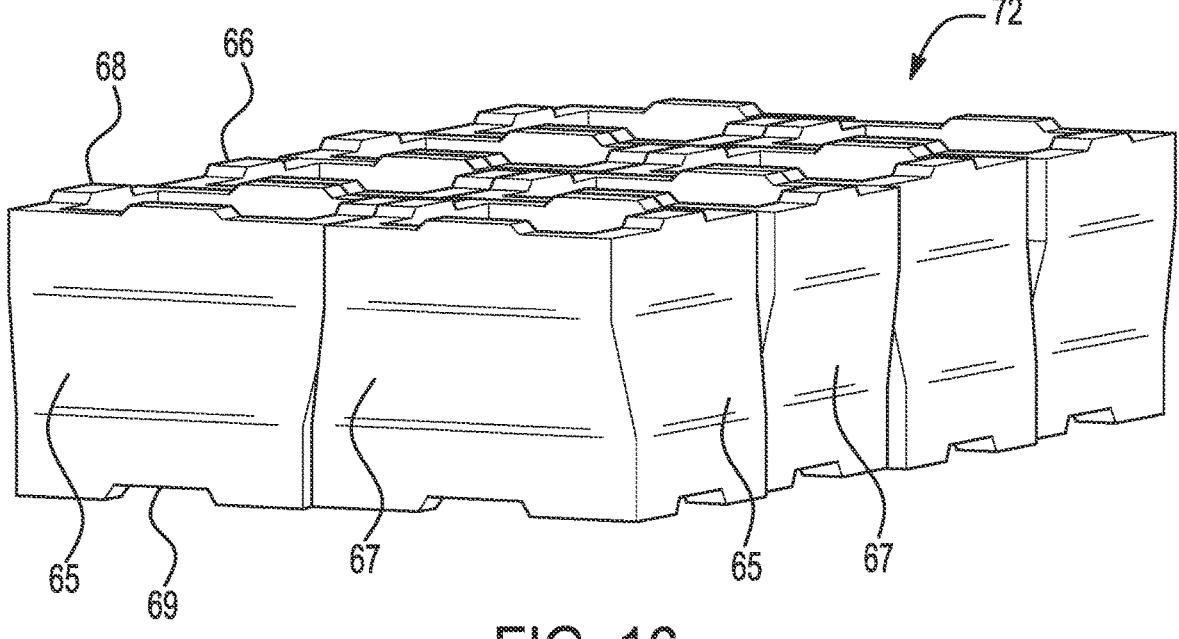
FIG. 16 is another perspective view illustrating an example of the layer of the refractory bricks according to the second embodiment of the invention.
Figure 17:
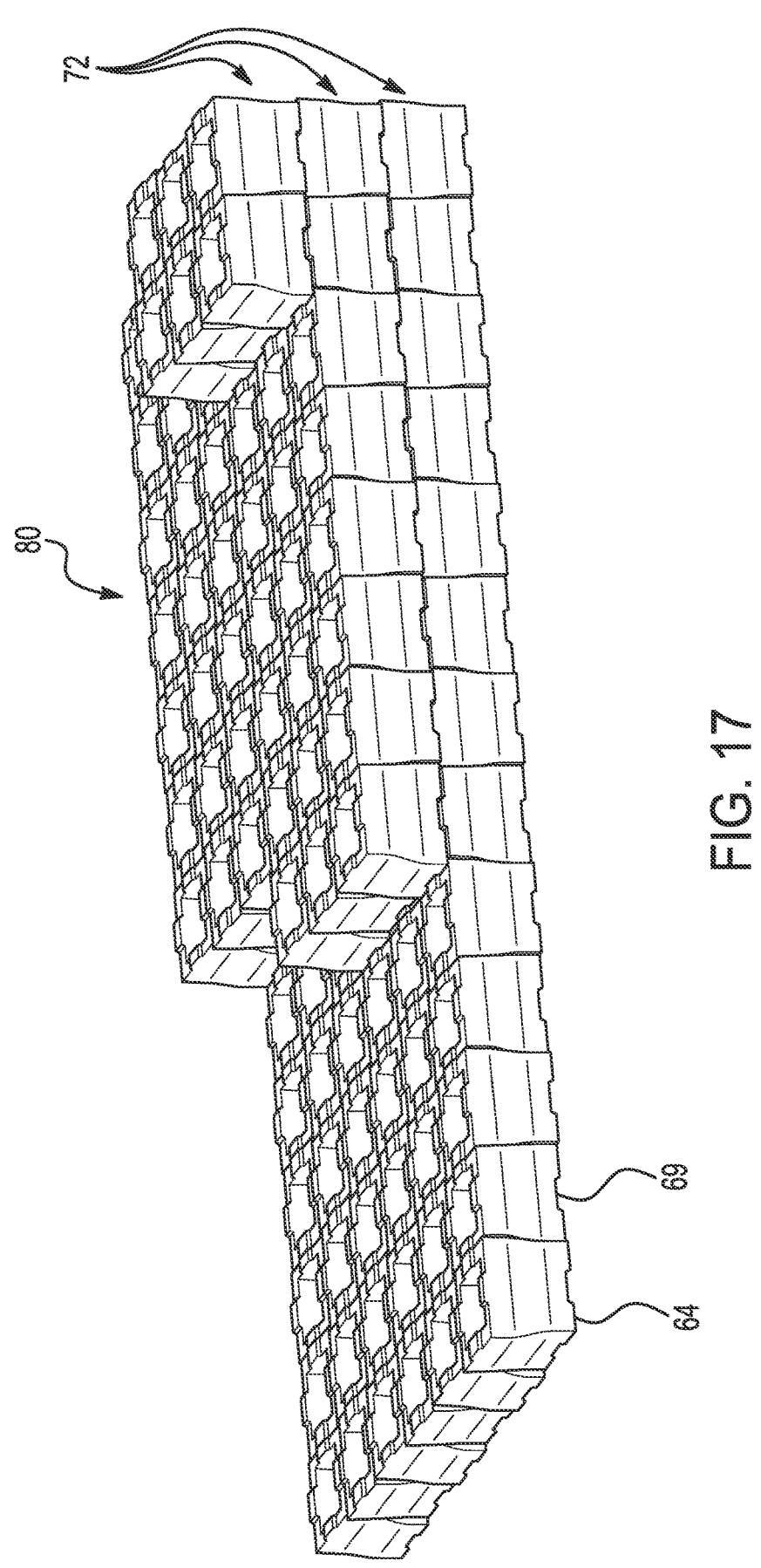
FIG. 17 is a perspective view illustrating an example of a refractory layer structure according to the second embodiment of the invention.

In addition, FIG. 12 is a perspective view illustrating an example of a refractory brick 64 according to a non-tessellated embodiment of the invention. FIGS. 13 and 14 are side views illustrating examples of the refractory brick 64. FIGS. 15 and 16 are perspective views illustrating examples of a refractory layer 72 according to a non-tessellated embodiment of the invention. FIG. 17 is a perspective view illustrating an example of a refractory layer structure 80 according to a non-tessellated embodiment of the invention.

The refractory brick 64 may be composed of various combinations of alumina, silica, alumina-silica, magnesia, magnesia-alumina, or combinations of such. The refractory brick 64 may be formed by hydraulic or isostatic pressing. The corresponding refractories are also known to be categorized as High Purity Alumina, High Alumina, Alumino-Silicate, Magnesia, Magnesia-Alumina, or Alumina-Magnesia products.

The refractory brick 64 is realized in the form of a cuboid. The cuboid is defined by a pair of oppositely positioned first diverging sides 65 that are curved in such a way as to diverge away from each other from a top of the refractory brick 64 to a bottom of the refractory brick 64 and a pair of oppositely positioned second diverging sides 67 that are angled in such a way as to diverge away from each other from a bottom of the refractory brick 64 to a top of the refractory brick 64. The second diverging sides 43 and the first diverging sides 41 are connected to each other and together define a vertically oriented passageway 70 extending through the refractory brick 64.

Each of the first diverging sides 65 has a first diverging side protrusion 66 projecting from a top surface thereof. Each of the second diverging sides 67 has a second diverging side protrusion 68 projecting from a top surface thereof. Each of the first diverging sides 65 and the second diverging sides 67 has a notch 69 formed in a bottom surface thereof.

The refractory layer 72 is comprised of a number of the refractory bricks 64. The refractory bricks 64 are placed in the refractory layer 72 such that any contact between the refractory bricks 64 is made between a first diverging side 65 of one of the refractory bricks 64 and a second diverging side 67 of another one of the refractory bricks 64. In other words, each of the refractory bricks 64 in the refractory layer 72 is rotated 90 degrees from the adjacent refractory brick 64. This pattern is repeated throughout the refractory layer 72, along with voids 73 that are formed in an area between groups of four refractory bricks 64 in which surfaces of the first diverging sides 65 and the second diverging sides 67 are not in contact with each other. The placement pattern of the refractory bricks 64 inhibits any vertical movement of the refractory bricks 64 within the refractory layer 70.

The refractory layer structure 80 is comprised of at least one of the refractory layers 72. When more than one of the refractory layers 72 define the refractory layer structure 80, the refractory layers 72 are stacked on each other. Each of the first diverging side protrusions 66 and second diverging side protrusions 68 of the refractory bricks 64 is dimensioned to fit into one of the notches 69 of the refractory bricks 64 to enable mating of vertically stacked refractory bricks 64. As such, the stacking of one refractory layer 72 on top of another refractory layer 72 results in the horizontal locking of the stacked refractory layers 72 due to the mating of the first diverging side protrusions 66 and the second diverging side protrusions 68 of the refractory bricks 64 of the bottom refractory layer 72 with the notches 69 of the refractory bricks 64 of the refractory layer 72 stacked on top thereof. The stacking of the refractory layers 72 in this fashion also maintains the vertically oriented passageways 70 of the refractory bricks 64 throughout the stacked refractory layers 72 for heat exchange purposes. As a result of the geometry of the refractory bricks 64 and the placement of the refractory bricks 64 within the refractory layers 72, localized stresses within the refractory layer structure 80 are redirected, reoriented, and diminished, resulting in a more uniform vertical load and a longer service life.

While the refractory brick 40, the refractory layer 48, and the refractory layer structure 56 are respectively similar to the refractory brick 64, the refractory layer 72, and the refractory layer structure 80, the first diverging sides 41 and the second diverging sides 43 of the refractory brick 40 are designed with abruptly formed angles. This design differs from that of the refractory brick 64, of which the first diverging sides 65 and the second diverging sides 67 are curved. Regardless of the design differences, the refractory brick 40 functions in the same manner as does the refractory brick 64.

In contrast with the examples illustrated in FIGS. 6-17, FIGS. 18-20 are perspective views respectively illustrating examples of a refractory brick 88, a refractory layer 96, and a refractory layer structure 104 according to a tessellated embodiment of the invention.

The refractory brick 88 may be composed of various combinations of alumina, silica, alumina-silica, magnesia, magnesia-alumina, or combinations of such. The refractory brick 88 may be formed by hydraulic or isostatic pressing. The corresponding refractories are also known to be categorized as High Purity Alumina, High Alumina, Alumino-Silicate, Magnesia, Magnesia-Alumina, or Alumina-Magnesia products.

The refractory brick 88 is realized in the form of a cuboid. The cuboid is defined by sides 89 having angles. Each of the sides 89 have identical angles. Oppositely positioned sides 89 are alike and parallel with each other. The sides 89 together define a vertically oriented passageway 91 extending through the refractory brick 88. Each of the sides 89 has a protrusion 90 projecting from a top surface thereof and a notch 92 formed in a bottom surface thereof.

Refractory bricks 88 are respectively arranged adjacent to and in contact with each other such that the refractory layer 96 of refractory bricks 88 is uninterrupted. Each of the refractory bricks 88 is in contact with one or more adjacent refractory bricks 88. The refractory bricks 88 are placed in the refractory layer 96 such that any contact between the refractory bricks 88 is made between sides 89 of respective refractory bricks 88 that are parallel. Each of the refractory bricks 88 in the refractory layer 96 is positioned in the same orientation as the adjacent refractory brick 88. This is repeated throughout the refractory layer 96, and inhibits any vertical movement of the refractory bricks 88 within the refractory layer 96.

As a result of the design of the refractory brick 88 and the positioning of the refractory bricks 88 in the refractory layer 96, the voids 49 and 73 that are formed in the refractory layers 48 and 72 are not formed in the refractory layer 96. The pattern of the refractory layer 96 is one in which the refractory bricks 88 having angles in contact with each other repeat themselves without any gaps or overlaps. Thus, the refractory layer 96 is a layer of the refractory bricks 88 locked by each other in a tessellated pattern.

The refractory layer structure 104 is comprised of at least one of the refractory layers 96. When more than one of the refractory layers 96 define the refractory layer structure 104, the refractory layers 96 are stacked on each other. Each of the protrusions 90 of the refractory bricks 88 is dimensioned to fit into one of the notches 92 of the refractory bricks 88 to enable mating of vertically stacked refractory bricks 88. As such, the stacking of one refractory layer 96 on top of another refractory layer 96 results in the horizontal locking of the stacked refractory layers 96 due to the mating of the protrusions 90 of the refractory bricks 88 of the bottom refractory layer 96 with the notches 92 of the refractory bricks 88 of the refractory layer 96 stacked on top thereof. The stacking of the refractory layers 96 in this fashion also maintains the vertically oriented passageways 91 of the refractory bricks 88 throughout the stacked refractory layers 96 for heat exchange purposes. As a result of the geometry of the refractory bricks 88 and the placement of the refractory bricks 88 within the refractory layers 96, localized stresses within the refractory layer structure 104 are redirected, reoriented, and diminished, resulting in a more uniform vertical load and a longer service life.

Figure 20:
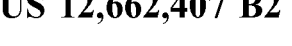
FIG. 20 is a perspective view illustrating an example of a refractory layer structure according to the third embodiment of the invention.
Figure 21:
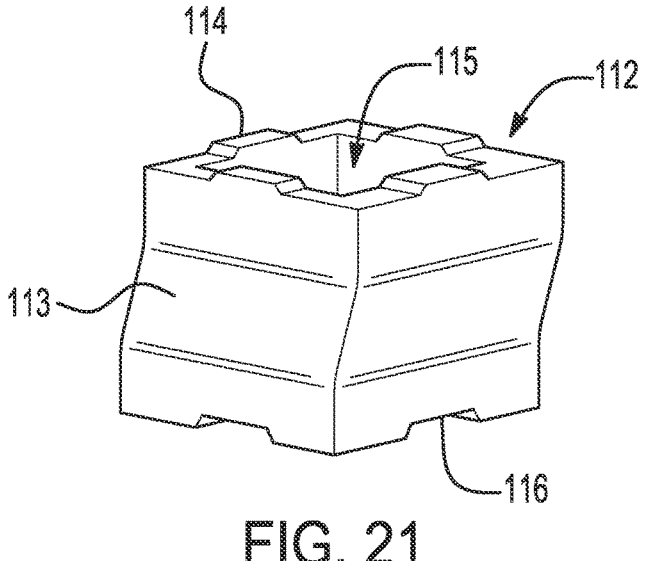
FIG. 21 is a perspective view illustrating an example of a refractory brick according to a fourth embodiment of the invention.
Figure 22:
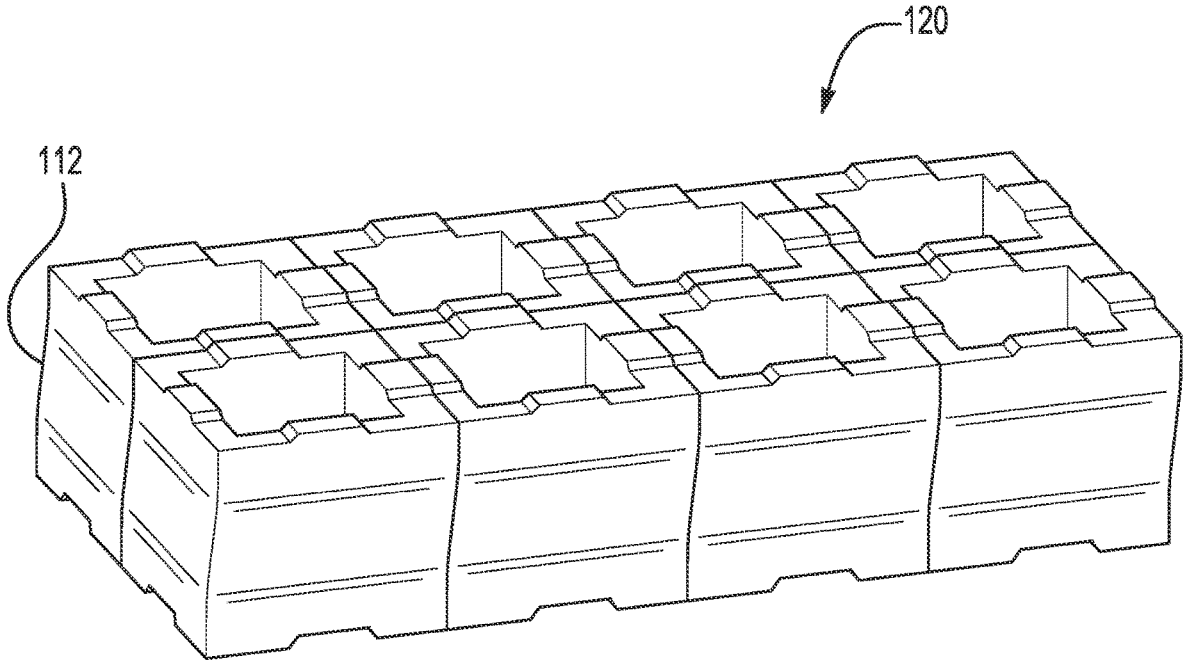
FIG. 22 is a perspective view illustrating an example of a layer of the refractory bricks according to the fourth embodiment of the invention.

While the refractory bricks 88 of each of the refractory layers 96 of the refractory layer structure 104 illustrated in FIG. 20 are positioned in the same orientation, embodiments described herein are not limited thereto. For example, where refractory bricks 88 of a bottom one of the refractory layers 96 are positioned in one orientation, the refractory bricks 88 of the refractory layer 96 placed on top of the bottom one of the refractory layers 96 could be positioned in an opposite orientation. In other words, each of the refractory bricks 88 positioned on top of the refractory bricks 88 of the bottom one of the refractory layers 96 may be turned horizontally 180°. The opposite turning of the refractory bricks 88 with respect to each of the stacked refractory layers 96 may be repeated throughout the refractory layer structure 104.

Corresponding with the examples illustrated in FIGS. 18-20, FIGS. 21-23 are perspective views respectively illustrating examples of a refractory brick 112, a refractory layer 120, and a refractory layer structure 128 according to another tessellated embodiment of the invention.

The refractory brick 112 may be composed of various combinations of alumina, silica, alumina-silica, magnesia, magnesia-alumina, or combinations of such. The refractory brick 112 may be formed by hydraulic or isostatic pressing. The corresponding refractories are also known to be categorized as High Purity Alumina, High Alumina, Alumino-Silicate, Magnesia, Magnesia-Alumina, or Alumina-Magnesia products.

The refractory brick 112 is realized in the form of a cuboid. The cuboid is defined by sides 113 having curvatures. Each of the sides 113 have identical curvatures. Oppositely positioned sides 113 are alike and parallel with each other. The sides 113 together define a vertically oriented passageway 115 extending through the refractory brick 112. Each of the sides 113 has a protrusion 114 projecting from a top surface thereof and a notch 116 formed in a bottom surface thereof.

Refractory bricks 112 are respectively arranged adjacent to and in contact with each other such that the refractory layer 120 of refractory bricks 112 is uninterrupted. Each of the refractory bricks 112 is in contact with one or more adjacent refractory bricks 112. The refractory bricks 112 are placed in the refractory layer 120 such that any contact made between the refractory bricks 112 is made between sides 113 of respective refractory bricks 112 that are parallel. Each of the refractory bricks 112 in the refractory layer 120 is positioned in the same orientation as the adjacent refractory brick 112. This is repeated throughout the refractory layer 120, and inhibits any vertical movement of the refractory bricks 112 within the refractory layer 120.

As a result of the design of the refractory brick 112 and the positioning of the refractory bricks 112 in the refractory layer 120, the voids 49 and 73 that are formed in the refractory layers 48 and 72 are not formed in the refractory layer 120. The pattern of the refractory layer 120 is one in which the refractory bricks 112 having curvatures in contact with each other repeat themselves without any gaps or overlaps. Thus, the refractory layer 120 is a layer of the refractory bricks 112 locked by each other in a tessellated pattern.

The refractory layer structure 128 is comprised of at least one of the refractory layers 120. When more than one of the refractory layers 120 define the refractory layer structure 128, the refractory layers 120 are stacked on each other. Each of the protrusions 114 of the refractory bricks 112 is dimensioned to fit into one of the notches 116 of the refractory bricks 112 to enable mating of vertically stacked refractory bricks 112. As such, the stacking of one refractory layer 120 on top of another refractory layer 120 results in the horizontal locking of the stacked refractory layers 120 due to the mating of the protrusions 114 of the refractory bricks 112 of the bottom refractory layer 120 with the notches 116 of the refractory bricks 112 of the refractory layer 120 stacked on top thereof. The stacking of the refractory layers 120 in this fashion also maintains the vertically oriented passageways 115 of the refractory bricks 112 throughout the stacked refractory layers 120 for heat exchange purposes. As a result of the geometry of the refractory bricks 112 and the placement of the refractory bricks 112 within the refractory layers 120, localized stresses within the refractory layer structure 128 are redirected, reoriented, and diminished, resulting in a more uniform vertical load and a longer service life.

Figure 23:
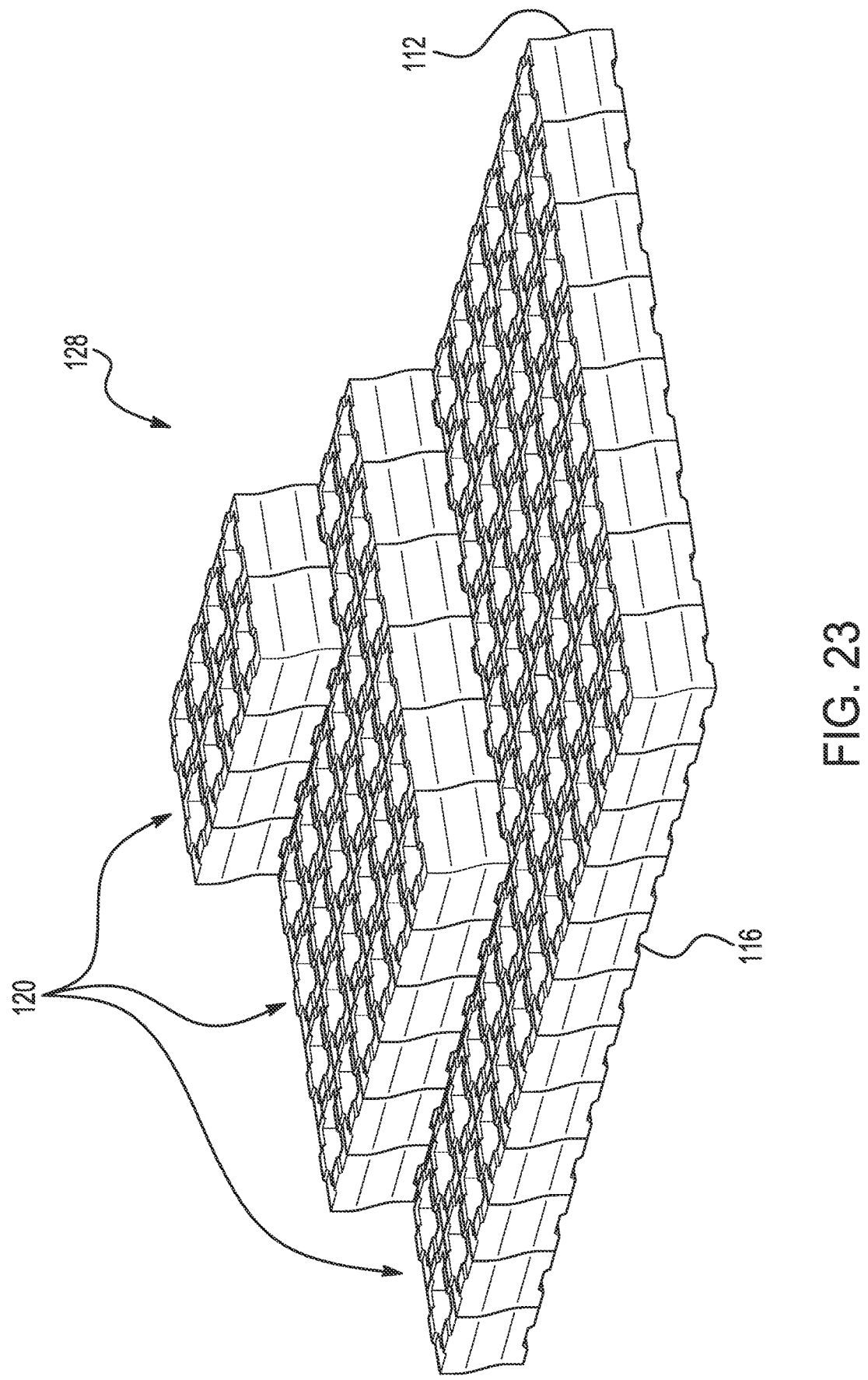
FIG. 23 is a perspective view illustrating an example of a refractory layer structure according to the fourth embodiment of the invention.

While the refractory bricks 112 of each of the refractory layers 120 of the refractory layer structure 128 illustrated in FIG. 23 are positioned in the same orientation, embodiments described herein are not limited thereto. For example, where refractory bricks 112 of a bottom one of the refractory layers 120 are positioned in one orientation, the refractory bricks 112 of the refractory layer 120 placed on top of the bottom one of the refractory layers 120 could be positioned in an opposite orientation. In other words, each of the refractory bricks 112 positioned on top of the refractory bricks 112 of the bottom one of the refractory layers 120 may be turned horizontally 180°. The opposite turning of the refractory bricks 112 with respect to each of the stacked refractory layers 120 may be repeated throughout the refractory layer structure 128.

Figure 24:
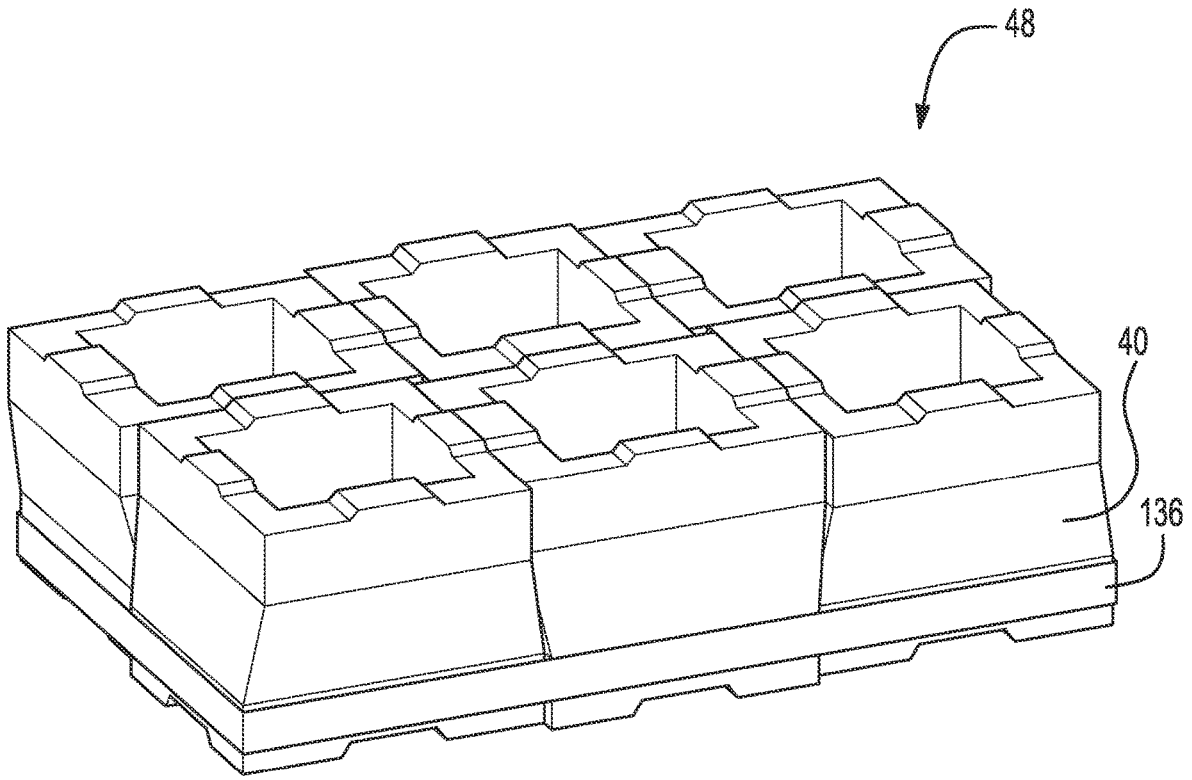
FIG. 24 is a perspective view illustrating an example of a layer of refractory bricks secured by a securing band according to an embodiment of the invention.

FIG. 24 illustrates an example of refractory layer 48 where refractory bricks 40 that are vertically secured are also horizontally secured to each other by a securing band 136. A securing band 136 may be positioned around a circumference of refractory layer 48 to secure locked refractory bricks 40. The securing band 136 may be fabricated with steel or heavy-duty polypropylene or polyester plastic, but are not limited thereto.

Figure 18:
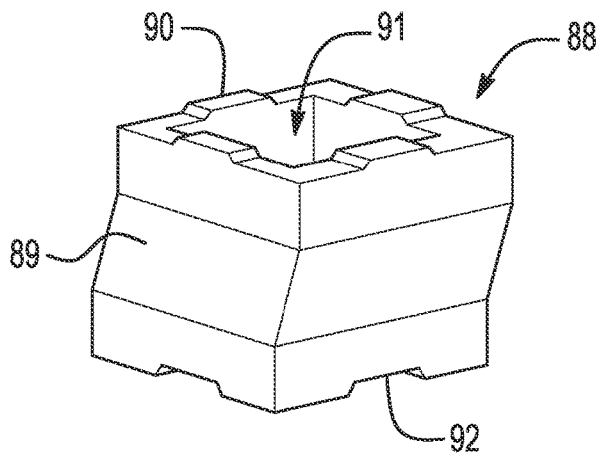
FIG. 18 is a perspective view illustrating an example of a refractory brick according to a third embodiment of the invention.
Figure 19:
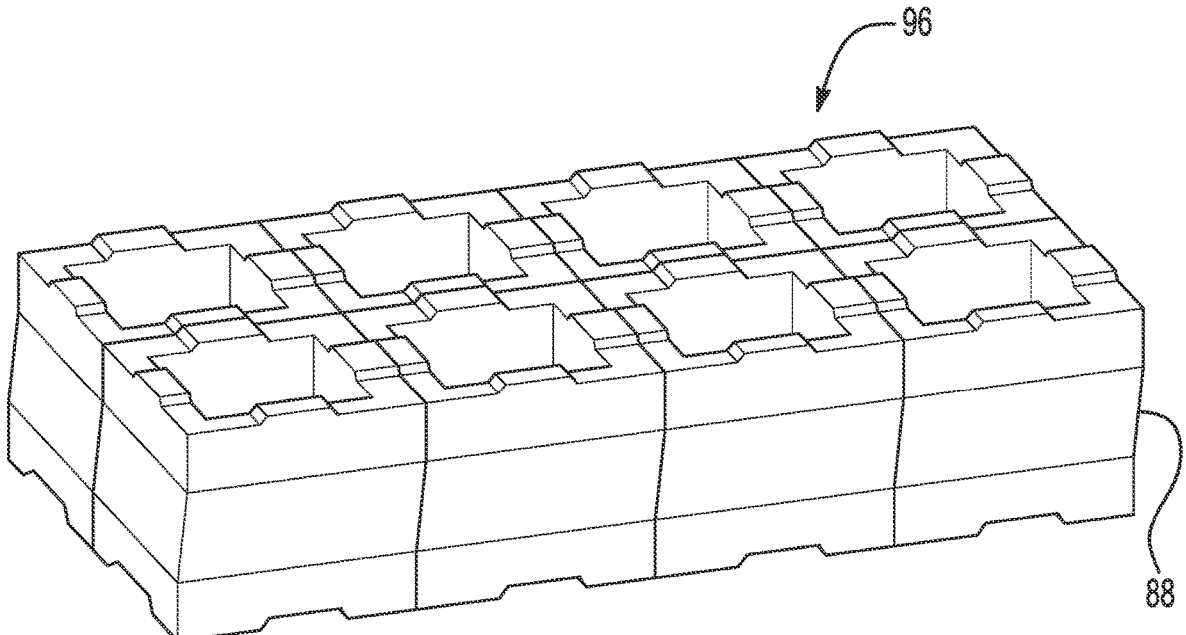
FIG. 19 is a perspective view illustrating an example of a layer of the refractory bricks according to the third embodiment of the invention.

The securing band 136 is shown in FIG. 24 securing the refractory layer 48. However, while not illustrated herein, the securing band 136 may be used to secure all of the refractory layers 72, 96, and 120. Further, one securing band 136 is illustrated in FIG. 18 securing the refractory layer 48. However, while not illustrated herein, more than one of the securing bands 136 may be used as the situation requires depending on the overall length of the refractory layers 48, 72, 96, and 120 and the surface area of the refractory layers 48, 72, 96, and 120.

The securing bands 136 may be used to secure the refractory layers 48, 72, 96, and 120 during installation of the refractory layers 48, 72, 96, and 120 into the regenerator chamber 4, operation of the glass melting furnace 2, or both. Specifically, while it is certainly contemplated that the construction of the refractory layers 48, 72, 96, and 120 and the refractory layer structures 56, 80, 104, and 128 could take place through conventional means previously described herein with respect to the check bricks 6 and the checker settings 16, 26, and 36, the refractory bricks 40, 64, 88, and 112 are designed to enable safer means of construction that is conventionally available.

While various means of construction could be contemplated, one construction example includes positioning the refractory bricks 40, 64, 88, and 112 into the refractory layers 48, 72, 96, and 120 outside of the regenerator chamber 4. After the refractory layers 48, 72, 96, and 120 are constructed, the refractory layers 48, 72, 96, and 120 are lifted via a crane or other appropriate device into the regenerator chamber 4. Subsequent refractory layers 48, 72, 96, and 120 are constructed, lifted into the regenerator chamber 4, and stacked on top of previously installed refractory layers 48, 72, 96, and 120, thereby ultimately forming the refractory layer structures 48, 72, 96, and 120.

While the orientation of the refractory bricks 40, 64, 88, and 112 are designed to establish horizontal and vertical security of the refractory layers 48, 72, 96, and 120 and the refractory layer structures 56, 80, 104, and 128 without any additional binding, the securing bands 136 may especially be used to secure the refractory bricks 40, 64, 88, and 112 together as the refractory layers 48, 72, 96, and 120 and maintain the security of the refractory layers 48, 72, 96, and 120 during the movement of the refractory layers 48, 72, 96, and 120 by the crane for installation of the refractory layers 48, 72, 96, and 120 in the regenerator chamber 4. Moreover, while the securing bands 136 may be removed from securing the refractory layers 48, 72, 96, and 120 after installation in the regenerator chamber 4, the aforementioned materials from which the securing bands 136 are composed may be sufficient to withstand exposure to the glass melting furnace 2 within the regenerator chamber 4, thereby providing an additional layer of vertical stability to the refractory layers 48, 72, 96, and 120 and, ultimately, the refractory layer structures 56, 80, 104, and 128.

The foregoing descriptions regard specific embodiments of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. A refractory layer structure, comprising:

a plurality of refractory layers stacked on each other, each of the refractory layers comprising refractory bricks, each of the refractory bricks being formed as a cuboid having a pair of oppositely positioned first diverging sides and a pair of oppositely positioned second diverging sides, the first diverging sides diverging away from each other from a top to a bottom of the refractory bricks, the second diverging sides diverging away from each other from the bottom to the top of the refractory bricks, the first diverging sides and the second diverging sides being connected to each other, each of the first diverging sides having a first diverging side protrusion projecting from a top surface thereof, each of the second diverging sides having a second diverging side protrusion projecting from a top surface thereof, each of the first diverging sides and the second diverging sides having a notch formed in a bottom surface thereof, the first diverging sides and the second diverging sides together defining a vertically oriented passageway extending through the refractory bricks of each of the stacked refractory layers, wherein any contact made between the refractory bricks within one of the refractory layers is made between one of the first diverging sides of one of the refractory bricks and one of the second diverging sides of another one of the refractory bricks, and wherein the first diverging side protrusions and the second diverging side protrusions of the refractory bricks of the one of the refractory layers are respectively fitted into the side notches of the refractory bricks of another one of the refractory layers stacked on the one of the refractory layers.

2. The refractory layer structure according to claim 1, wherein the refractory bricks are composed of one or more materials from the group consisting of alumina, silica, alumina-silica, magnesia, and magnesia-alumina.

3. The refractory layer structure according to claim 1, wherein the first diverging sides and the second diverging sides are one of angled and curved.

4. The refractory layer structure according to claim 1, wherein each of the refractory bricks in the refractory layers is rotated 90 degrees from adjacent refractory bricks.

5. The refractory layer structure according to claim 1, further comprising:

one or more securing bands positioned around a circumference of at least one of the refractory layers, the securing bands being configured to secure the refractory bricks of the at least one of the refractory layers.

6. A refractory layer structure, comprising:

a plurality of refractory layers stacked on each other, each of the refractory layers comprising refractory bricks locked by each other in a tessellated pattern, each of the refractory bricks having sides, each of the sides having a protrusion projecting from a top surface thereof and a notch formed in a bottom surface thereof, the sides defining a vertically orienting passageway extending through the refractory bricks of each of the stacked refractory layers, wherein any contact made between the sides of the refractory bricks within one of the refractory layers is made between one of the sides of one of the refractory bricks that is parallel with one of the sides of another one of the refractory bricks, and wherein the side protrusions of the refractory bricks of the one of the refractory layers are respectively fitted into the side notches of the refractory bricks of another one of the refractory layers stacked on the one of the refractory layers.

7. The refractory layer structure according to claim 6, wherein each of the refractory bricks is formed as a cuboid defined by the sides, the sides having one of angles and curvatures, wherein oppositely positioned ones of the sides are alike and parallel with each other.

8. The refractory layer structure according to claim 6, wherein the refractory bricks are respectively arranged adjacent to and in contact with each other such that each of the refractory layers is uninterrupted.

9. The refractory layer structure according to claim 6, wherein each of the refractory bricks within the one of the refractory layers is positioned in an orientation that is the same as an orientation of an adjacent one of the refractory bricks.

10. The refractory layer structure according to claim 6, wherein the refractory bricks are composed of one or more materials from the group consisting of alumina, silica, alumina-silica, magnesia, and magnesia-alumina.

11. The refractory layer structure according to claim 6, further comprising:

one or more securing bands positioned around a circumference of at least one of the refractory layers, the securing bands being configured to secure the refractory bricks of the at least one of the refractory layers.

* * * * *